Oct. 6, 1964
N. C. SCHUTT ETAL
3,151,522
APPARATUS FOR HANDLING A CONTACT SCREEN
IN A PHOTOMECHANICAL CAMERA
Filed Dec. 18, 1961
3 Sheets-Sheet 1
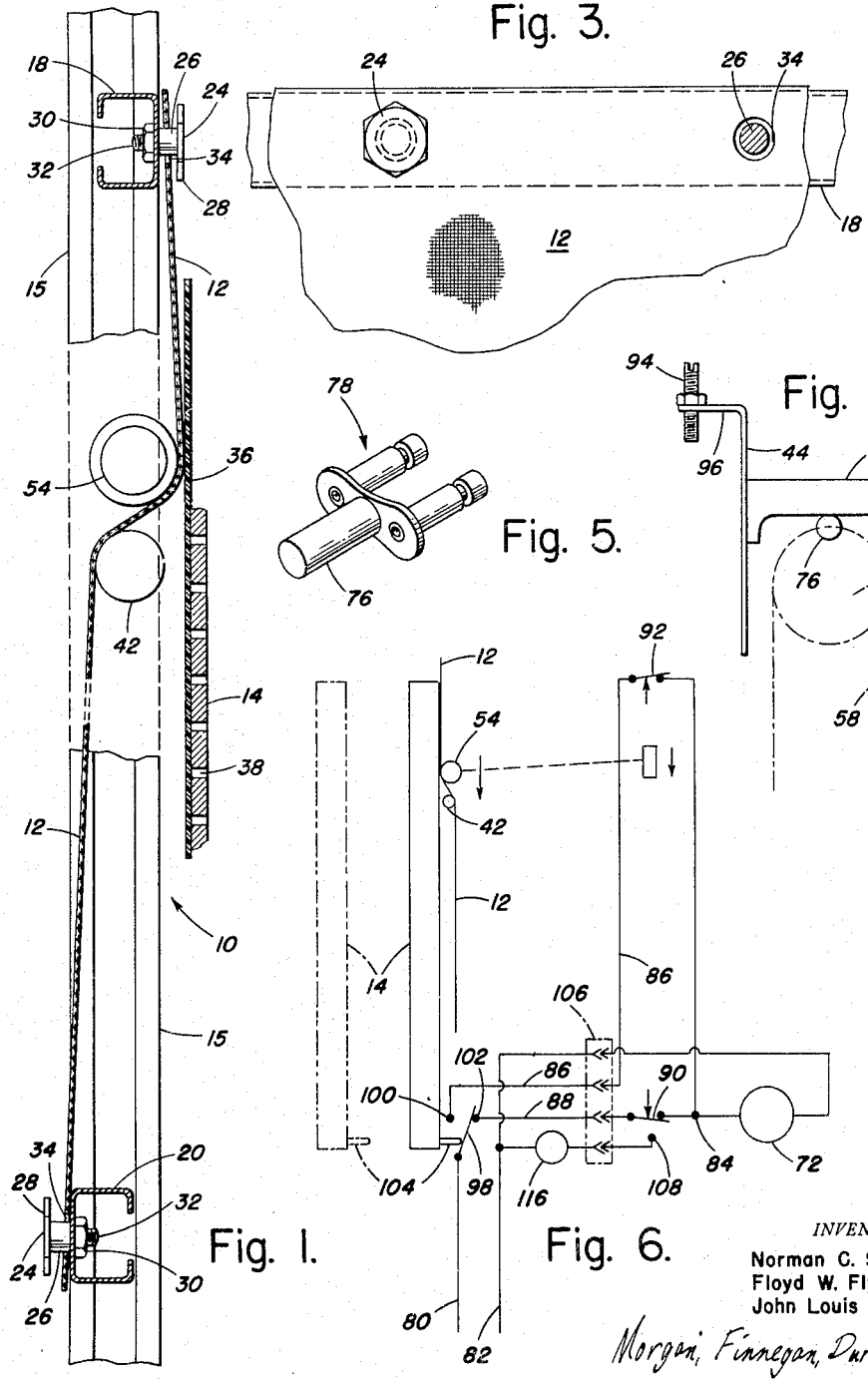
INVENTORS
Norman C. Schutt
Floyd W. Flynn
John Louis Bjelland
Morgan, Finnegan, Durham & Pine
ATTORNEYS

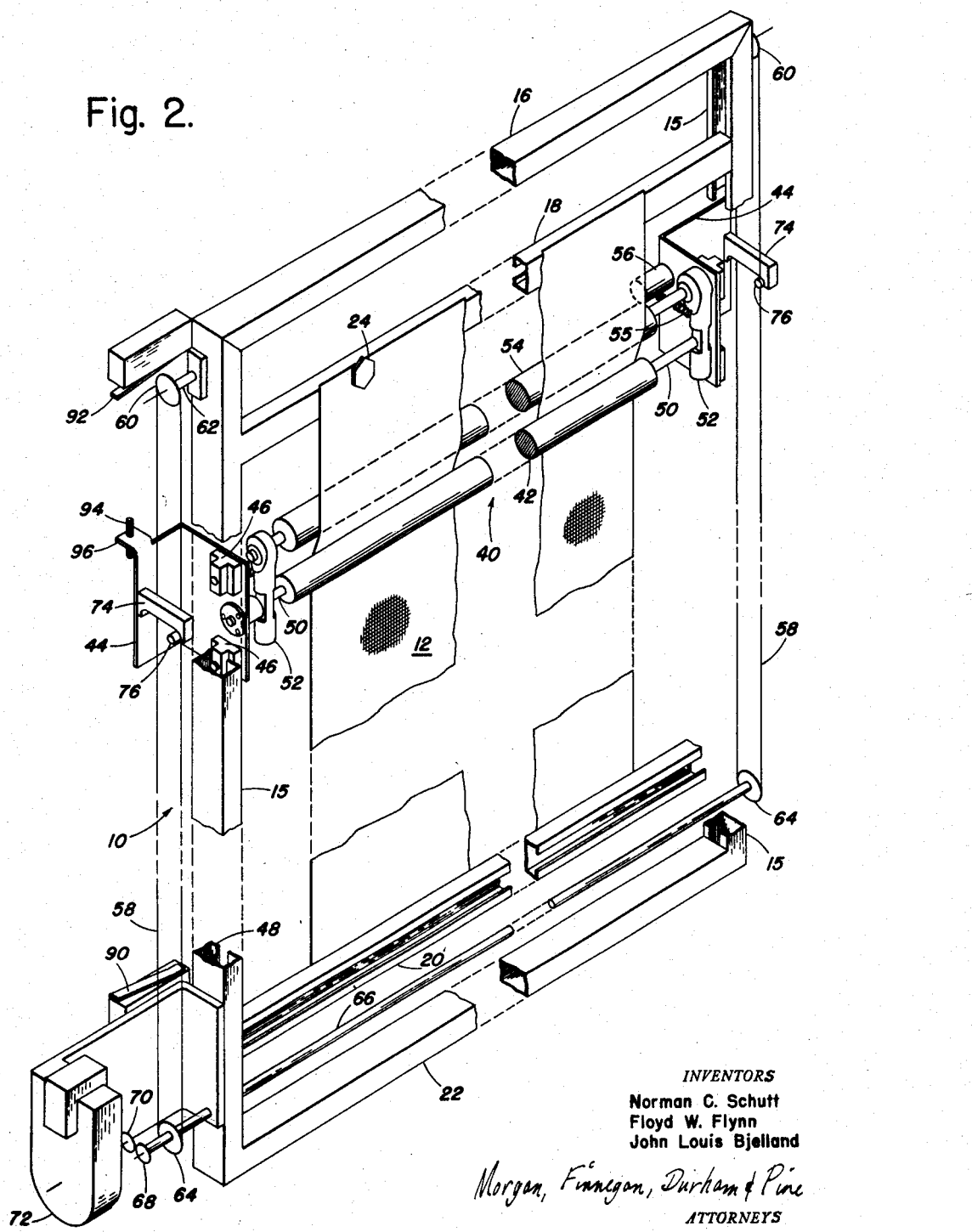

Oct. 6, 1964   N. C. SCHUTT ETAL   3,151,522
APPARATUS FOR HANDLING A CONTACT SCREEN
IN A PHOTOMECHANICAL CAMERA
Filed Dec. 18, 1961   3 Sheets-Sheet 3

INVENTORS
NORMAN C. SCHUTT
FLOYD W. FLYNN
JOHN LOUIS BJELLAND
BY Morgan, Finnegan, Durham & Pine
ATTORNEYS

# United States Patent Office 3,151,522
Patented Oct. 6, 1964

3,151,522
APPARATUS FOR HANDLING A CONTACT SCREEN IN A PHOTOMECHANICAL CAMERA
Norman C. Schutt and Floyd W. Flynn, Glen Cove, and John L. Bjelland, Sea Cliff, N.Y., assignors to Powers Chemco, Inc., Glen Cove, N.Y., a corporation of New York
Filed Dec. 18, 1961, Ser. No. 159,999
7 Claims. (Cl. 88—24)

This invention relates generally to photomechanical camera apparatus and has specific relation to mechanism for handling a contact half-tone screen in a photomechanical camera and applying the screen to a film sheet on the face of a vacuum film support.

Objects and advantages of the invention will be obvious herefrom, or may be learned by practice with the invention, the same being realized and attained by means of the instrumentalities and combinations pointed out in the appended claims.

This application is a continuation-in-part of our previously filed application Serial No. 727,897, filed April 11, 1958, now U.S. Patent No. 3,068,748, issued December 18, 1962, in the names of Norman C. Schutt, Floyd W. Flynn and John Louis Bjelland, for Apparatus for Handling a Contact Screen in a Photomechanical Camera.

It is an object of this invention to provide an improved apparatus for handling and manipulating a flexible contact type half-tone screen in a photomechanical camera in order to smoothly apply the screen over a film sheet on the face of a vacuum film support. Another object is to provide such a screen handling apparatus which is effective to smoothly apply the flexible contact type half-tone screen to the film sheet and the face of the vacuum film support from the upper region of the screen downwardly in a manner that assures that the screen is wrinkle free and that there are no air pockets between the screen and the film sheet on the face of the film support. Still another object is to provide such a screen handling apparatus wherein the flexible contact type half-tone screen is supported in a suitable frame with mechanical means being carried by the frame for smoothing the screen onto the film sheet from the upper region of the screen downwardly. A still further object is to provide such a screen handling apparatus wherein the portion of the screen immediately below that being applied to the film sheet and the face of the film support is maintained in spaced relation with the film and support during the smoothing operation assuring a smooth overlay of the screen on the film sheet. Another object is to provide such a screen handling apparatus wherein the vacuum film support and the screen are relatively movable and wherein the mechanical mechanism for applying the screen to the film sheet on the face of the film support is automatically moved from its upper to its lowermost position upon moving the film support and screen from a position where they are spaced from each other to a position where they are adjacent each other and to automatically move this mechanism from its lower to its upper position when the film support and screen are moved from adjacent relation into spaced relation. Still another object is to provide such an apparatus for smoothly and automatically applying the flexible, contact type half-tone screen to the film on the face of a vacuum film support which apparatus is extremely simple in construction and yet reliable in its operation of providing a smooth wrinkle free, overlay of the screen on the film sheet.

Another object of the invention is to provide means in association with the half-tone screen applying apparatus for urging the film against the film support in advance of the half-tone screen applying apparatus.

In accordance with the present invention there is provided in a photomechanical camera a support frame for a flexible contact type half-tone screen with the frame being placed in front of a vacuum type film support or backing member and with the frame and film support being relatively movable to and from a position where they are in spaced relation and a position where they are adjacent to each other. Loosely hung in the frame is a flexible, contact type half-tone screen that is to be applied over a film sheet on the face of the film support when the screen support frame and the film support are moved from their spaced relation into adjacent relation. The film sheet and half-tone screen are held in place on the face of the film support by suction that is applied through openings distributed over the face of the film support. The half-tone screen is wider than the film sheet and suction is applied to the screen through the openings distributed about and outwardly of the film sheet and which the screen overlays with this suction drawing the screen against the film sheet and the face of the film support. The screen is smoothed on or applied to the film sheet and the face of the film support by special apparatus that is carried by the screen support frame and that is effective to assure a smooth overlay of the screen on the film sheet. This special mechanism includes a pair of vertically spaced rollers that extend transversely of the screen and that are simultaneously movable in the support frame in a vertical direction. The upper roller is effective to urge the screen into engagement with the film sheet and the face of the film support while the lower roller is effective to maintain the portion of the screen immediately below that being applied to the film sheet in spaced relation with the film sheet and support face assuring a smooth application of the screen to the film and assuring against there being entrapped air pockets. The rollers are vertically moved through a suitable drive mechanism which includes a pair of chains at each side of the screen support frame trained over gears at opposite ends of the support frame with these chains being operated or driven by a suitable power source, as for example, an electrical motor. The drive mechanism for the vertically movable rollers is automatically operated with their being mechanism to control this drive so that upon moving the screen support frame and the film support into juxtaposition the rollers are moved from their upper to their lowermost position within the support frame while when the support frame and film support are moved out of adjacent relation into spaced relation the rollers are automatically returned from their lowermost to their uppermost position.

Means is provided for urging the film against the vacuum film support in advance of the application of the flexible half-tone screen. This means includes a plow element affixed to the roller supports and movable therewith. As the rollers move vertically to apply the half-tone screen, the plow element is adapted to first contact the film urging it against the vacuum board. Thus, the film is brought into over-all contact with the vacuum film support prior to the application of the half-tone screen thereto.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

In the drawings:

FIGURE 1 is a vertical sectional view, partially fragmentary, of a contact type half-tone screen support assembly constructed in accordance with the present invention and mounted in a photomechanical camera in adjacent relation to and immediately in front of a vacuum film support that forms part of the camera;

FIGURE 2 is a perspective view of the contact type screen assembly, per se, and this illustration is taken looking from the direction of the film support;

FIGURE 3 is a fragmentary view of the upper end of the screen and support showing the way the screen is connected to or hung from the support;

FIGURE 4 is an elevational side view of the support arm and a portion of the support bracket for the roller mechanism and shows the support arm engaged with the pin extending from the carrier link of one of the drive chains and shows the adjustable microswitch actuator that is carried by the support bracket;

FIGURE 5 is a perspective view of one of the carrier links that forms part of each of the drive chains;

FIGURE 6 is a schematic representation showing the wiring diagram for the motor control and showing how the movement of the film support effects the operation of the motor;

Figure 9:
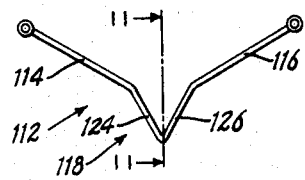
FIGURES 9 and 10 show modified forms of the film applying elements.

Referring now to the drawings, wherein like references are used throughout to designate like elements, the preferred and illustrative embodiment of the invention depicted therein comprises a support frame 10 for a flexible contact type half-tone screen 12 with the frame being mounted in front of the vacuum film support represented as 14 and with both the screen support frame and film support being disposed in and forming part of a photomechanical camera. Film support 14 and frame 10 are relatively movable away from and toward each other along the optical axis of the camera and while this relative movement may be had by mounting either the support frame 10 or vacuum back 14 so that either or both may be axially moved within the camera, in the embodiment herein illustrated and described the vacuum back or film support is movable toward and away from the screen frame while this frame remains stationary. Support frame 10 includes the upright side members 15 between the upper end of which extend cross members 16 and 18 and between the lower end of which extend the cross members 20 and 22.

The flexible contact type half-tone screen 12 is loosely hung within frame 10 with the upper end of the screen being supported from cross member 18 while the lower end is loosely held against cross member 20. The screen is attached to these cross members by means of the screw members 24 which are provided with a shouldered cylindrical portion 26 that extends from the face of the cross member and maintains the head 28 of the screw in spaced relation with this face. These screw members are secured to the cross members by nut 30 that is threaded upon shank 32 and there are a number of these screw members spaced along the cross members 18 and 20. The cylindrical portion 26 of each of these screw members is received within a suitable opening 34 in the screen with these openings being enlarged relative to this cylindrical portion. Since cylindrical portion 26 has an axial dimension that is substantially greater than the thickness of the screen and since openings 34 are enlarged with respect to this cylindrical portion 26 of members 24 the screen may move a limited distance both vertically and horizontally with relation to the cross members 18 and 20 and is only loosely hung within the support frame so that it may be applied to the face of film support 14 and over a sheet of film 36 that is held against the face of the film support.

When the screen support frame 10 is in spaced relation with or spaced away from film support 14 the film sheet 36 is placed over the face of the film support and is held in place by suction which is applied through openings 38 in the film support, with these openings being distributed throughout the area of the face of the film support and with the suction being applied through a suitable manifold that forms a part of the film support and that is connected to a suction or vacuum source. The details of the film support by which suction is applied to the openings 38 do not form a part of this invention and are accordingly not illustrated. After thus positioning the film against the face of film support 14, the film support is moved from its spaced position with relation to screen support frame 10 into juxtaposition with this support frame as shown in FIGURE 1 and as represented in solid lines in FIGURE 6. Flexible half-tone screen 12 is then applied to the face of the film support and over film sheet 36 with this screen being applied to the film support and film from the upper region of the screen progressively downward and with the screen extending beyond the edges of the film so that the screen is progressively sucked into firm contact with the film support and the film via suction through the openings 38 that are laterally disposed about the film and are covered by the screen. The air between the film sheet and the screen as well as betwen the screen and the face of the film support is drawn or evacuated through these openings so that the screen lies in firm, intimate contact with the film and the film support for exposure of the film.

The half-tone screen is applied to the film and the film support through a roller assembly 40 which is carried by frame 10 and is vertically movable within the frame. This roller assembly includes spacing roller 42 which is carried by and extends between the angle support brackets 44 and which is parallel with the face of film support 14. Each of these brackets has secured to it a pair of vertically spaced bearing blocks 46 that have a T-shaped cross section, the shank of which is slidably received in slot 48 provided in the inwardly facing surface of each of the side members 15. Pivotally carried by the reduced end portions 50 of spacing roller 42 are the pair of spaced arms 52, with smoothing roller 54 extending between and being journaled within the upper ends of these arms, with this support for roller 54 being such that the roller will adjust or align itself for parallel relation with the face of the film support. As shown in FIGURE 1, smoothing or pressure roller 54, which has a rubber surface, moves screen 12 into engagement with film sheet 36 and the face of film support 14 while spaced roller 42 maintains the portion of the screen immediately below roller 54 in spaced relation with film sheet 36 and the face of the film support. Smoothing roller 54 is urged toward film support 14 by means of compression springs 55 which are interposed between a lug 56 on the brackets 44 and the pivotal arms 52. As a result of the bias provided by these springs, roller 54 is effective to apply screen 12 to film sheet 36 and the face of the vacuum film support with a predetermined pressure which assures a smooth overlay of the screen on the film and the film support, with the roller, through this bias, being self-aligning with relation to the face of the film support so that assurance is had that the screen is forced into engagement with the film sheet by roller 54 across the entire width of the film sheet.

Vertical movement of the roller assembly 40 within support frame 10 is provided through a motor actuated drive mechanism that is automatically operated in response to movement of the vacuum film support from its spaced relation with the screen support frame into and from juxtaposition with this frame. This drive organization for the roller assembly includes the pair of chains or similar endless members 58 mounted in each side of support frame 10 and trained over an upper gear 60, mounted on laterally extending rod or shaft 62, and lower gear 64 secured to shaft 66. Also secured to shaft 66 is gear 68 which meshes with gear 70 that is mounted on the shaft of electric motor 72. Each of the angle support brackets 44 includes a support arm 74 which is in parallel relation with the two vertically extending runs of the adjacent chain 58 and has its lower surface curved as shown and in engagement with laterally extending pin 76. This pin forms a part of carrier link 78 and there is one such link in each of the chains 58, with these links being in a common horizontal plane at all times. With this organization it is not necessary to have a reversible drive in order to move roller assembly 40 up and down within support frame 10, but motor 72 need only by unidirectional and by driving the pair of chains 58 in the same direction the roller assembly will be moved up and down within the support frame with pins 76 merely moving from one end to the other of support arms 74 when the arm reaches the upper extremity of chains 58 and with arms 74 resting upon shaft 66 when links 78 reach gears 64 and pass around the periphery of these gears.

In order that roller assembly 40 will be automatically operated in response to movement of the film support 14 to and from juxtaposition with screen support frame 10, a suitable control circuit for motor 72 is provided. This circuit includes conductors 80 and 82 that are connected between a suitable source of potential. Conductor 82 is connected directly with one terminal of motor 72 while the other terminal of the motor, i.e. terminal 84, is connected with conductor 80 through parallel circuits 86 and 88. Within circuit 88 is limit switch 90 biased to the closed position, and within circuit 86 is a similar limit switch 92 with the switches preferably being microswitches. These switches are actuated by the adjustable actuator 94 threadedly received in the bent-over ear 96 formed on bracket 44. The double throw switch 98 controls the connection of the parallel circuits 86 and 88 with conductor 80. This double throw switch is biased into engagement with contact 100 and is moved into engagement with contact 102 by finger 104 on film support 14 when the film support is moved from its position in spaced relation with frame 10, which portion is shown in dotted lines in FIGURE 6, into adjacent relation or juxtaposition with this frame and accordingly screen 12, with this latter portion being shown in solid lines in FIGURE 6. In order to facilitate assembly and disassembly a four-pronged plug and socket 106 is employed in the control circuit.

When film support 14 is in its spaced position from screen frame 10 (dotted line position shown in FIGURE 6) roller assembly 40 is in its uppermost portion where actuator 94 opens switch 92. Upon moving the film support from this spaced relation, after suction is applied to the film support and a film sheet has been positioned over the face thereof, finger 104 moves switch 98 into engagement with contact 102 when the film support is adjacent the screen frame (solid line position in FIGURE 6) and the film sheet lies in the focal plane of the camera. This energizes motor 72 through circuit 88 and causes the drive organization to move roller assembly 40 vertically downward in frame 10 from its upper to its lowermost position. Upon moving the film support adjacent the screen frame assembly 10, roller 54 is effective to urge the screen into engagement with the film sheet and as the roller assembly is moved downward in frame 10 it is effective through the medium of smoothing or pressure roller 54 and spacing roller 42 to successively and smoothly apply the flexible screen over the film and the face of the film support from their upper region downwardly so that the contact, half-tone screen properly overlays the film for exposure of the film. When the roller assembly reaches its lower limit of movement, actuator 94 opens switch 90 with relation to circuit 88 and moves this switch into engagement with contact 108 so that light 110 is lit indicating that the half-tone screen is in position for exposure of the film. Upon switch 90 opening circuit 88, motor 72 is deactivated and the drive is accordingly deactivated. The various elements remain in these relative positions until film support 14 is moved away from the screen and screen frame with manipulation of the film support being either manual or through any desired motor drive mechanism. Immediately prior to this movement, vacuum is released from the vacuum film support so that the screen and film are no longer held by suction against the face of this support. Then upon moving film support 14 away from screen support frame 10 switch 98 is moved from engagement with contact 102 into engagement with contact 100 thereby energizing motor 72 through circuit 86. This causes roller assembly 40 to move upward with actuator 92 moving out of contact with switch 90 so that this switch closes with relation to circuit 88 and moves away from contact 108 under the influence of a suitable bias so that pilot light 110 goes out. Roller assembly 40 is then moved to its uppermost position with actuator 94 contacting and opening normally closed switch 92 thereby de-energizing motor 72, with the control organization then being ready for another cycle of operation.

It will thus be seen that with the present invention by moving the film support and the screen support frame from spaced relation into adjacent relation the roller assembly is automatically actuated to smoothly apply the flexible half-tone screen over the film sheet retained against the vacuum film support from the upper region of the screen progressively downward with a pilot light indicating when the screen is fully applied or overlying the film and with the roller assembly being stopped upon reaching the lower end of its movement; while upon moving the film support and screen support frame from adjacent each other into spaced relation the roller assembly is moved from its lowermost to its uppermost position where it is again ready to smoothly apply the half-tone screen over the film sheet and the face of the film support.

Figure 7:
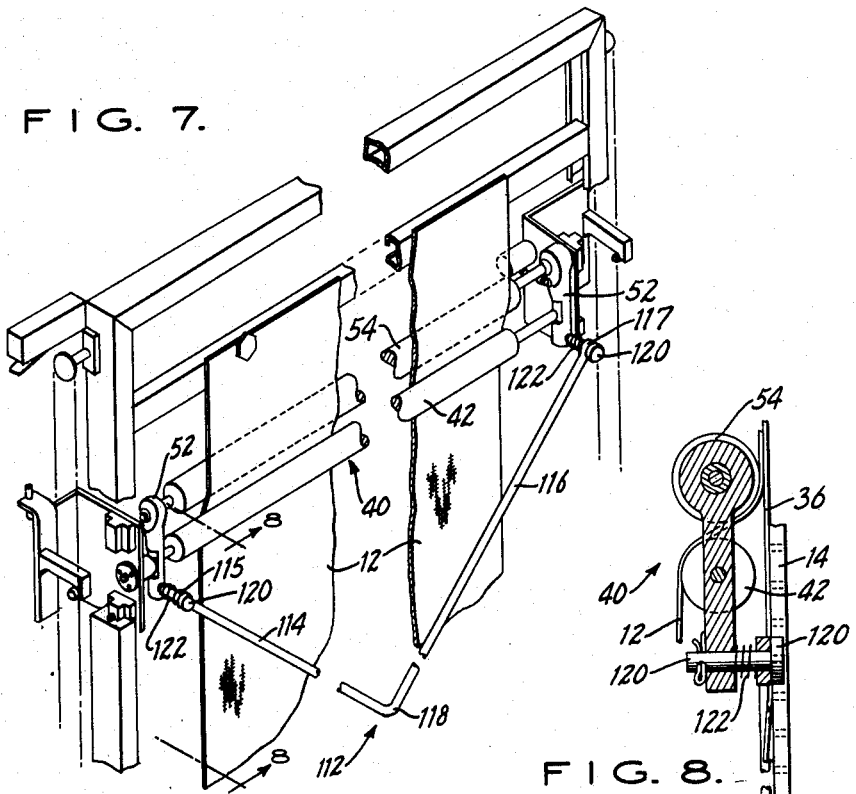
FIGURE 7 is a perspective view similar to FIGURE 2 illustrating the film applying element.
Figure 8:
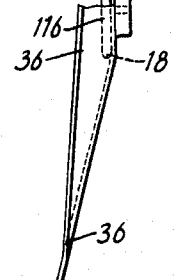
FIGURE 8 is a sectional view taken along line 8—8, FIG. 7.

In certain atmospheric conditions and with certain types of film, such as, the paper-backed films, film sheet 36 has a tendency to bend or buckle such that the side edges thereof are out of contact with vacuum film support 14. (See FIG. 8.) When this occurs, it will be understood that the operation of the roller assembly 40 is adversely effected. To correct this situation, means is provided for urging a buckled film sheet 36 into overall contact with film support 14 in advance of travel of roller assembly 40 therepast. This means includes a plow element 112 having a pair of joined angularly-related coplanar sections 114 and 116. Sections 114 and 116 are joined at an apex 118 located in spaced relation below roller 42 as shown in FIG. 7. End 115 of section 114 and the corresponding end 117 of section 116 are secured at their respective sides of roller assembly 40 to the arm 52 located thereat. Ends 115 and 117 are each mounted to its respective arm 52 by means of a pin 120. Each end 115, 117 is loosely mounted on its associate pin 120. However, plow element 112 is urged toward film sheet 36 by means of suitable springs 122 mounted on pins 120 between the ends 115, 117 of plow element 112 and arm 52. The bias provided by springs 122 ensures a preselected resilient pressure for smoothly applying sheet 36 to support 12 and further provides a degree of self-alignment with relation to the face of support 12 to assure complete overall engagement of the film sheet 36 and its vacuum support 12.

In operation, as roller assembly 40 moves downwardly to apply flexible half-tone screen 12 to film sheet 36 in response to the actuation of switch 98, plow element 112, biased toward film sheet 36 and disposed in advance of roller assembly 40, initially contacts film sheet 36, urging it into over-all engagement with its vacuum film support 14 before application of screen 12 to sheet 36, to insure a properly disposed film 36 and screen 12 in exposure position on support 14. Upon movement of film support 14 away from the screen support frame 10, roller assembly 40 and plow element 112 are returned to their uppermost position to await the next cycle of operation.

Figure 11:
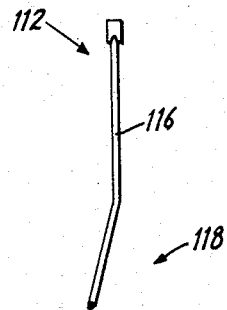
FIGURE 11 is a sectional view taken along line 11—11, FIG. 9.
Figure 12:
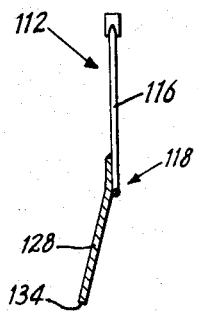
FIGURE 12 is a sectional view taken along line 12—12, FIG. 10.

In the modification of the plow element 112 shown in FIG. 9, the apex 118 comprises an extension including an additional pair of intersecting sections 124 and 126 which are extensions of legs 114 and 116 respectively. However, sections 124 and 126 are more acutely angularly related than legs 114 and 116. In addition, as shown best in FIG. 11, sections 124 and 126 are bent out of the vertical plane containing sections 114 and 116. Sections 124 and 126 are in a vertical plane at angle to the plane of sections 114 and 116 away from film support 12. This outward bend of the apex section has been found beneficial in initially engaging the buckle film sheet 36 and urging into the zone of operation of legs 114 and 116 of the plow element 112 for proper application of the film sheet 36 to its vacuum support 12.

Figure 10:
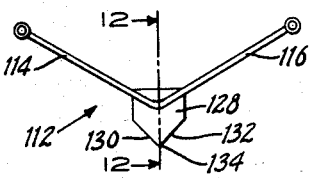

FIGURE 10 discloses another modification of plow element 112. In this embodiment, plow element 112 includes an upper bracket 128 attached to plow 112 at apex 118. Bracket 128 includes a pair of angularly-related side sections 130 and 132 meeting at a peak 134. However, side sections 130 and 132 are bent outwardly out of the vertical plane of plow 112 away from film support 12 to urge a buckled sheet 36 into the range of operation of legs 114 and 116 for proper application of the film sheet 36 to its vacuum support 12.

The invention in its broader aspects is not limited to the specific mechanism shown and described but departures may be made therefrom, within the scope of the accompanying claims, without departing from the principles of the invention and without sacrificing its chief advantages.

What is claimed is:

1. In a photomechanical camera, having a vacuum film support, a half-tone screen applying device including a frame, a flexible contact type half-tone screen supported by the frame, a screen-applying element, means mounting said element in said frame for movement over the face of said film support to smoothly apply said half-tone screen to a film sheet on said support and means operatively associated with said screen applying element and movable therewith to urge said film sheet into over-all contact with said support in advance of the application of said half-tone screen thereto by said applying element.

2. In a photomechanical camera having a vertically-disposed vacuum film support, a flexible screen applying assembly comprising a frame, a flexible contact-type screen supported by said frame, a roller assembly, means mounting said roller assembly in said frame for vertical movement over the face of said support to smoothly apply said screen to a film sheet on said support and a plow element supported by said roller assembly and vertically movably therewith to urge said film sheet into over-all engagement with its support in advance of the application of said screen thereto by said roller assembly.

3. The invention as defined in claim 2 wherein said plow element includes a pair of angularly related interconnected arms, means mounting said arms on said roller assembly for disposition between said film support and said flexible screen.

4. In a photomechanical camera having a vacuum film support, a half-tone screen applying assembly having a flexible, contact-type, half-tone screen mounted therein and including a pair of elongated members extending transversely of said screen, means movably mounting said members for simultaneous transverse movement in a direction parallel with the face of the support to apply said screen to a film sheet on said support said flexible screen being trained over said elongated members and said members being disposed so that one of said members urges the screen into engagement with said film sheet on said support while the other member retains the screen portion at one side of said screen urging member in spaced relation with said film support, plow means mounted on member mounting means and disposed transversely of said film support in said space between said screen and film support and means for simultaneously moving said members and said plow means across the film supporting face to said vacuum support in a direction to progressively urge said film sheet into over-all contact with said film support and to progressively apply said screen to said film sheet on said film support.

5. The invention as defined in claim 4 wherein said plow means includes a pair of angularly-related arms joined at an apex located adjacent the middle of said elongated members in spaced relation therewith in the direction of movement of said members whereby said arms engage and urge said film sheet into engagement with said support in advance of the application of said screen thereto.

6. The invention as defined in claim 5 wherein the portion of said arms adjacent said apex are bent into a plane angularly inclined to the plane including the remainder of the arms and away from said film support whereby said bent apex portion facilitates application of said film to said support.

7. The invention as defined in claim 5 including a plow element means mounting said plow element to the apex of said arms with a portion thereof extending beyond said apex, means forming said extended portion of said plow element in a plane inclined at an angle to the plane including said arms and away from said film support whereby said plow element facilitates application of said film to said support.

References Cited in the file of this patent
UNITED STATES PATENTS

| 1,894,005 | Rose | Jan. 10, 1933 |
| 2,836,099 | Weishaupt | May 27, 1958 |

UNITED STATES PATENT OFFICE
CERTIFICATE OF CORRECTION

Patent No. 3,151,522

October 6, 1964

Norman C. Schutt et al.

It is hereby certified that error appears in the above numbered patent requiring correction and that the said Letters Patent should read as corrected below.

Column 8, lines 1 and 2, strike out "plow element supported by said roller assembly and verply said screen to a film sheet on said support and a" and insert instead -- ply said screen to a film sheet on said support and a plow element supported by said roller assembly and ver- --; column 8, line 29, for "face to" read -- face of --.

Signed and sealed this 30th day of March 1965.

(SEAL)
Attest:

ERNEST W. SWIDER
Attesting Officer

EDWARD J. BRENNER
Commissioner of Patents